United States Patent
Rubino et al.

(10) Patent No.: US 11,527,795 B2
(45) Date of Patent: Dec. 13, 2022

(54) HERMETIC WELD FOR A THIN FILM ELECTROCHEMICAL CELL ACTIVATED WITH A SOLID ELECTROLYTE AND HOUSED IN A CERAMIC CASING

(71) Applicant: Greatbatch Ltd., Clarence, NY (US)

(72) Inventors: Robert S. Rubino, Williamsville, NY (US); Keith W. Seitz, Clarence Center, NY (US); Xiaohong Tang, Williamsville, NY (US); Todd C. Sutay, Warsaw, NY (US); Brian P. Hohl, Clarence, NY (US); Holly Noelle Moschiano, Elma, NY (US); Biswa P. Das, Thousand Oaks, CA (US); Afsar Ali, Maple Grove, MN (US); Sourabh Biswas, Williamsville, NY (US); Gary Freitag, East Aurora, NY (US); David Dianetti, Lancaster, NY (US); Ho-Chul Yun, East Amherst, NY (US); Thomas Marzano, East Amherst, NY (US)

(73) Assignee: Greatbatch Ltd., Clarence, NY (US)

(*) Notice: Subject to any disclaimer, the term of this patent is extended or adjusted under 35 U.S.C. 154(b) by 457 days.

(21) Appl. No.: 16/788,679

(22) Filed: Feb. 12, 2020

(65) Prior Publication Data
US 2020/0185662 A1 Jun. 11, 2020

Related U.S. Application Data

(63) Continuation of application No. 16/240,173, filed on Jan. 4, 2019, now Pat. No. 11,011,787.
(Continued)

(51) Int. Cl.
*H01M 50/10* (2021.01)
*H01M 50/116* (2021.01)
(Continued)

(52) U.S. Cl.
CPC .......... *H01M 50/10* (2021.01); *H01M 4/131* (2013.01); *H01M 10/0525* (2013.01);
(Continued)

(58) Field of Classification Search
CPC .. H01M 50/10; H01M 4/131; H01M 10/0525; H01M 50/116; H01M 50/147;
(Continued)

(56) References Cited

U.S. PATENT DOCUMENTS

| 5,338,625 A | 8/1994 | Bates et al. |
| 6,268,079 B1 | 7/2001 | Inoue et al. |

(Continued)

FOREIGN PATENT DOCUMENTS

| DE | 102011103975 A1 | 12/2012 |
| EP | 0269007 A1 | 6/1988 |

(Continued)

OTHER PUBLICATIONS

Extended European Search Report, Application No. 19150718.0, dated Apr. 4, 2019.

*Primary Examiner* — Gary D Harris
(74) *Attorney, Agent, or Firm* — Michael F. Scalise (57) ABSTRACT

A miniature electrochemical cell having a total volume that is less than 0.5 cc is described. The cell casing is formed by joining two ceramic casing halves together. One or both casing halves are machined from ceramic to provide a recess that is sized and shaped to contain the electrode assembly. The opposite polarity terminals are metal feedthroughs, such as of gold, and are formed by brazing gold into openings machined into one or both of ceramic casing halves. A thin film metallization, such as of titanium, contacts an edge periphery of each ceramic casing half. The first ceramic casing half is moved into registry with the second ceramic casing half so that the first and second ring-shaped metal-
(Continued)

lizations contact each other. Then, a laser welds through one of the casing halves being a substantially transparent ceramic, for example sapphire, to braze the first and second ring-shaped metallizations to each other to thereby join the first and second casing halves together to form a casing housing the electrode assembly. A solid electrolyte ($Li_xPO_yN_z$) activates the electrode assembly.

26 Claims, 4 Drawing Sheets

Related U.S. Application Data (60) Provisional application No. 62/614,623, filed on Jan. 8, 2018, provisional application No. 62/820,499, filed on Mar. 19, 2019.

(51) Int. Cl.
*H01M 50/147* (2021.01)
*H01M 50/155* (2021.01)
*H01M 50/169* (2021.01)
*H01M 50/186* (2021.01)
*H01M 50/191* (2021.01)
*H01M 50/543* (2021.01)
*H01M 4/131* (2010.01)
*H01M 10/0525* (2010.01)

(52) U.S. Cl.
CPC ....... *H01M 50/116* (2021.01); *H01M 50/147* (2021.01); *H01M 50/155* (2021.01); *H01M 50/169* (2021.01); *H01M 50/186* (2021.01); *H01M 50/191* (2021.01); *H01M 50/543* (2021.01)

(58) Field of Classification Search
CPC ............. H01M 50/155; H01M 50/169; H01M 50/186; H01M 50/191; H01M 50/543; H01M 50/103; H01M 50/117; H01M 50/119; H01M 50/124; H01M 50/157; H01M 50/55; H01M 50/562; Y02E 60/10
USPC ........................................................ 429/185
See application file for complete search history.

(56) References Cited

U.S. PATENT DOCUMENTS

| | | |
|---|---|---|
| 6,782,290 B2 | 8/2004 | Schmidt |
| 6,818,356 B1 | 11/2004 | Bates |
| 6,984,468 B2 | 1/2006 | Rubino et al. |
| 7,022,146 B2 | 4/2006 | Rubino et al. |
| 7,524,577 B2 | 4/2009 | Bates |
| 7,553,582 B2 | 6/2009 | Bates |
| 7,811,702 B2 | 10/2010 | Laurent et al. |
| 8,653,384 B2 | 2/2014 | Tang et al. |
| 8,679,674 B2 | 3/2014 | Liang et al. |
| 8,697,278 B2 | 4/2014 | Schnell et al. |
| 8,778,532 B2 | 7/2014 | Salot et al. |
| 8,815,450 B1 | 8/2014 | Bates |
| 8,865,340 B2 | 10/2014 | Liang et al. |
| 9,318,774 B2 | 4/2016 | Bhardwaj et al. |
| 9,455,423 B2 | 9/2016 | Etzkorn et al. |
| 9,599,842 B2 | 3/2017 | Flitsch et al. |
| 9,793,522 B2 | 10/2017 | Bhardwaj et al. |
| 9,887,403 B2 | 2/2018 | Huang et al. |
| 10,236,480 B2 | 3/2019 | Fallourd |
| 2005/0007718 A1 | 1/2005 | Stevenson et al. |
| 2010/0129717 A1 | 5/2010 | Bedjaoui et al. |
| 2015/0004478 A1 | 1/2015 | Prinzbach et al. |
| 2015/0214567 A1 | 7/2015 | Etzkorn et al. |
| 2016/0049624 A1 | 2/2016 | Bhardwaj et al. |
| 2016/0254566 A1 | 9/2016 | Pepin et al. |
| 2016/0325105 A1 | 11/2016 | Etzkorn et al. |
| 2016/0365584 A1 | 12/2016 | Etzkorn et al. |
| 2018/0108496 A1* | 4/2018 | Venkateswaran ..... B23K 11/115 |

FOREIGN PATENT DOCUMENTS

| | | |
|---|---|---|
| EP | 2262036 B1 | 3/2012 |
| EP | 2192638 B1 | 4/2013 |
| EP | 2469620 B1 | 8/2013 |

* cited by examiner

HERMETIC WELD FOR A THIN FILM ELECTROCHEMICAL CELL ACTIVATED WITH A SOLID ELECTROLYTE AND HOUSED IN A CERAMIC CASING

CROSS-REFERENCE TO RELATED APPLICATIONS

This application is a continuation of U.S. application Ser. No. 16/240,173, filed on Jan. 4, 2019, now U.S. Pat. No. 11,011,787, which claims priority to U.S. provisional application Ser. No. 62/614,623, filed on Jan. 8, 2018. This application also claims priority to U.S. provisional application Ser. No. 62/820,499, filed on Mar. 19, 2019.

BACKGROUND OF THE INVENTION

1. Field of the Invention

This invention relates to the conversion of chemical energy to electrical energy. More particularly, the present invention relates to an electrochemical cell having a total size or volume that is less than 0.5 cc. Such so-called miniaturized electrochemical cells enable numerous new and improved medical device therapies. Miniature electrochemical cells are defined as those having a size or total volume that is less than 0.5 cc.

2. Prior Art

Electrochemical cells must have two opposite polarity terminals that are electrically isolated from each other. In use, the terminals are connected to a load, such as the circuitry in an implantable medical device to power the medical device. In that respect, an electrochemical cell which is sufficiently hermetic to prevent ingress of moisture and egress of electrolyte so that it can operate for 10 years or more requires robust sealing methodologies while still providing adequate electrical isolation between the opposite polarity terminals. However, conventional sealing techniques are often not practical when cell size drops below 0.5 cc. That is because the seals themselves take up a major portion of the overall cell volume.

Thin film batteries are a convenient approach for the assembly of small cells. Electroactive layers are deposited, typically by physical vapor deposition, onto a substrate with an intermediary layer of solid electrolyte that also functions as a separator to electrically isolate the two terminals. The substrate must be able to withstand high temperatures during layer deposition and during any required annealing of the deposited layers. Typically, ceramics are used as substrates with a non-porous lid attached using a polymeric adhesive layer that also serves as the feedthrough for the electrically charged terminals. The problem is that the polymeric adhesive layer cannot consistently and adequately prevent egress or ingress of atmospheric contaminants that can disrupt charging and discharging of the cell. For example, ingress of water is particularly problematic for lithium cells. Thus, polymeric seals may not provide the consistent longevity required for some applications.

Moreover, as electrochemical cells become smaller and smaller, it becomes more difficult to find space for a port for filling electrolyte into their casing. As the fill port becomes smaller, it becomes increasingly more difficult to find a practical means of plugging and hermetically sealing the fill port. For electrochemical cells that have a total volume or size that is less than 0.5 cc, it becomes advantageous to use a solid electrolyte so that no filling is required.

Further, since secondary electrochemical cells activated with a solid electrolyte typically undergo expansion and contraction during charging and discharging, they require hermetic encapsulation approaches that suitably accommodate this cycling induced dimensional change. Those types of hermetic enclosures for miniature electrochemical cells do not currently exist.

For that reason, the present invention provides encapsulation technologies that are suitable for use with hermetically sealed solid-state secondary or re-chargeable electrochemical cells and that have sufficient dimensional flexibility to accommodate the expected dimensional changes during cycling. While useful with cells of virtually any size, the present encapsulation techniques are particularly well suited for cells having a total volume or size that is less than 0.5 cc.

SUMMARY OF THE INVENTION

The present invention describes various electrochemical cell constructions which are readily adapted to miniature cell designs. While the present cell designs are adapted for miniature electrochemical cells, the designs are also applicable to cells that are not classified as "miniature". A miniature electrochemical cell is defined as a cell having a total volume that is less than 0.5 cc. Moreover, the present electrochemical cells are not limited to any one chemistry and can be of an alkaline cell, a primary lithium cell, a rechargeable lithium cell, a Ni/cadmium cell, a Ni/metal hydride cell, a supercapacitor, a thin film solid-state cell, and the like. Preferably, the cell is a lithium-ion electrochemical cell comprising a carbon-based or $Li_4Ti_5O_{12}$-based anode and a lithium metal oxide-based cathode, such as of $LiCoO_2$ or lithium nickel manganese cobalt oxide ($LiNi_aMn_bCo_{1-a-b}O_2$). The present invention is also useful with a solid-state thin film electrochemical cell having a lithium anode, a metal-oxide based cathode and a solid electrolyte, such as an electrolyte of LiPON ($Li_xPO_yN_z$).

Thus, there are many possible configurations for an electrochemical cell according to the present invention, which are generally categorized by the concepts listed below:

Cell Concept A

An electrochemical cell according to the present invention comprises an electrode assembly comprising an anode of an anode active material conductively contacted to an anode current collector and a cathode of a cathode active material conductively contacted to a cathode current collector. The anode and cathode are segregated from direct physical contact with each other and activated with an electrolyte. Further, the electrode assembly is housed in a ceramic casing. The casing comprises a first ceramic substrate having a first peripheral edge extending to and meeting with opposed first substrate outer and inner major faces. A first ring-shaped metallization contacts the first substrate inner major face adjacent to the first substrate peripheral edge. A second ceramic substrate having a second substrate peripheral edge extends to and meets with opposed second substrate outer and inner major faces. A second ring-shaped metallization contacts the second substrate inner major face adjacent to the second substrate peripheral edge. The first and second ring-shaped metallizations are in a hermetically sealed relationship with each other to thereby hermetically seal the first and second ceramic substrates together to form the casing.

Further, a first opening extends through the first ceramic substrate in alignment with the anode current collector, and a first gold body hermetically sealed to the first ceramic substrate in the first opening conductively contacts the anode current collector to thereby serve as a negative terminal for the cell. A second opening extends through the first ceramic substrate in alignment with the cathode current collector, and a second gold body hermetically sealed to the first ceramic substrate in the second opening conductively contacts the cathode current collector to thereby serve as a positive terminal for the electrochemical cell.

Preferably, at least one of the first and second ceramic substrates is of a substantially transparent sapphire ceramic.

Cell Concept B

1) The cell enclosure or casing is formed by joining two ceramic casing halves together. Suitable ceramics are selected from polycrystalline alumina, single-crystal alumina, or 3 mol % YSZ. One or both casing halves are machined from the ceramic to provide a recess that is sized and shaped to contain the electrode assembly.

2) Preferably the ceramic substrates or plates comprising the casing halves have a surface roughness that is greater than zero, but less than 50 nm, and more preferably less than 10 nm. The ceramic substrates are lapped and polished with a slurry or ceramic-coated grinding paper followed by diamond polishing to produce the desired surface roughness. Having a surface roughness that is greater than zero, but less than 50 nm, and more preferably, less than 10 nm helps prevent coating defects including cracks, protrusions, discontinuities and coating adhesion problems during subsequent cell processing steps. Suitable ceramics for this purpose are 3 mol % YSZ, polycrystalline alumina, and sapphire.

3) The opposite polarity terminals are metal feedthroughs, such as of gold, and are formed by brazing gold into openings machined into one or both ceramic casing halves. The perimeter surfaces of the ceramic defining these openings are pre-coated with a thin-film metallization of titanium, niobium or other metallic layer to facilitate adhesion of the gold to the ceramic.

4) The two ceramic casing halves are separated from each other by a metal interlayer, such as of gold, bonded to a thin film metallization adhesion layer, such as of titanium, that contacts an edge periphery of each ceramic casing half. The metal interlayer is present on one or both ceramic halves and the two casing halves are joined by diffusion bonding or laser welding. Alternatively, gold is eliminated, and a titanium metallization is used to bond the ceramic casing halves together.

5) Thin film metallic layers, preferably of titanium, copper, or platinum are applied to the inner surfaces of the ceramic casing halves. These metallic layers serve as the opposite polarity current collectors. Preferably the metallic current collector layers cover as much of the ceramic casing half as possible without contacting the adhesion layer residing between the casing halves. This spaced relationship prevents corrosion of the gold by the metallic current collector layers. Then, the electrode active materials are sequentially applied and adhered directly to the metallic current collectors using various types of physical vapor deposition.

6) A solid electrolyte ($Li_xPO_yN_z$) is deposited between the anode and cathode layers to activate the electrode assembly.

7) The cell casing is designed so that there is a gap between an upper surface of the electrode assembly and the casing that ranges from about 1 μm to about 100 μm. This gap allows for expansion of the electrode assembly during charging and discharging without compromising hermeticity of the ceramic casing.

Cell Concept C

This cell concept includes all elements of Cell Concepts A and B except only one of the two ceramic casing halves is machined with a recess. The other casing half is a planar substantially transparent sapphire ceramic.

In all of the cell concepts, the ceramic casing halves can be made of different ceramic materials. Preferably, the ceramic casing halves are of alumina, 3%-YSZ or another ceramic which can be machined. Preferably one of the two ceramic halves is of a single-crystal alumina (sapphire) or other ceramic which is transparent. The transparent ceramic allows the two case halves to be joined together by laser welding through the transparent ceramic to melt the gold interlayer. This facilitates fabrication of electrochemical cells in multi-cell arrays/sheets to make the manufacturing process more cost-effective and practical.

These and other aspects of the present invention will become increasingly more apparent to those skilled in the art by reference to the following detailed description and to the appended drawings.

DETAILED DESCRIPTION OF THE PREFERRED EMBODIMENTS

As used herein, the term "transparent" is defined as a material having the property of transmitting rays of light through its substance so that bodies situated beyond or behind can be distinctly seen.

The term "sapphire" is defined as a variety of the mineral corundum, consisting of aluminum oxide ($\alpha$-$Al_2O_3$) with trace amounts of elements such as iron, titanium, chromium, copper, or magnesium. It is typically blue, but can also occur in yellow, purple, orange, and green colors (parti-sapphires show two or more colors). The only color that sapphire cannot be is red—as red colored corundum is called ruby, another corundum variety. Sapphire is a remarkably hard material—9 on the Mohs scale (the third hardest mineral, after diamond at 10 and moissanite at 9.5), which makes it uniquely suited for use as a casing material according to the present inventions.

Figure 1:
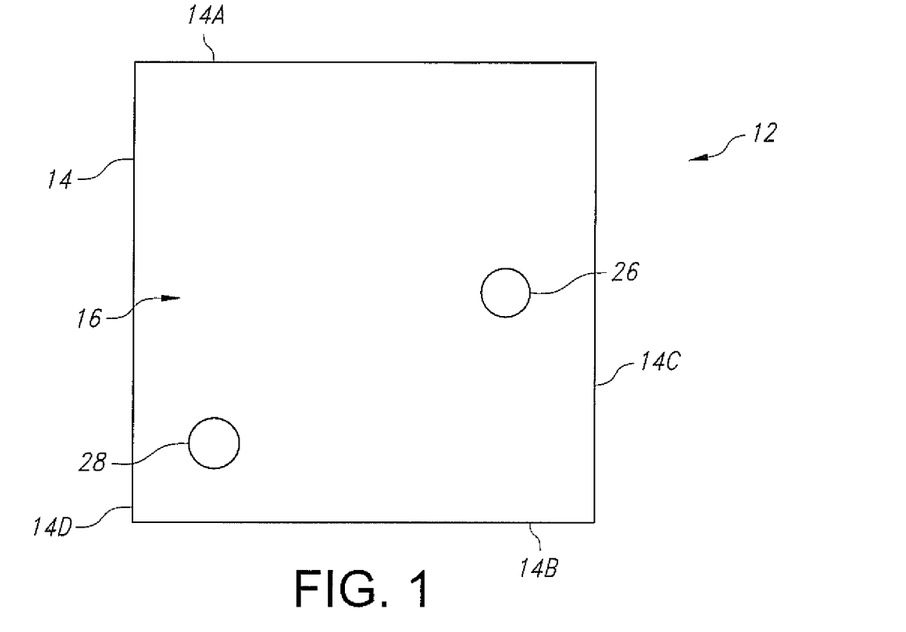
FIG. 1 is a plan view of a ceramic cathode base substrate 12 of a casing for the electrochemical cell 10 illustrated in FIGS. 2 and 2A.
Figure 2:
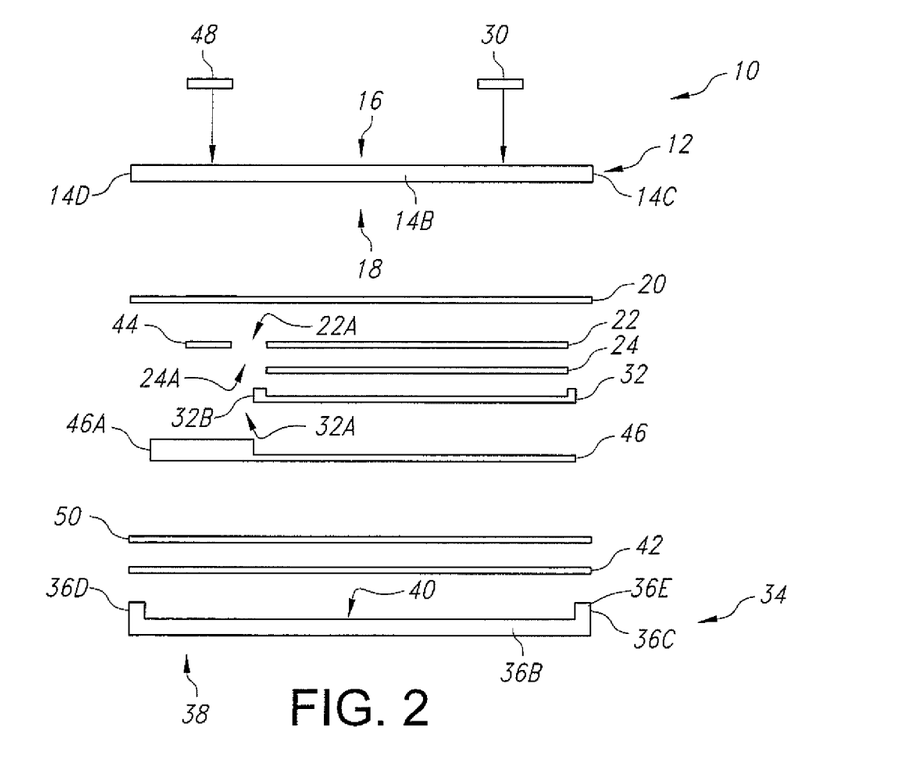
FIG. 2 is an exploded side-elevational view of an electrochemical cell 10 according to one embodiment of the present invention.

Turning now to the drawings, FIGS. 1 and 2 illustrate one embodiment of an electrochemical cell 10 according to the present invention. The electrochemical cell 10 comprises a first plate-shaped ceramic substrate 12 that is preferably selected from polycrystalline alumina, 3 mol % YSZ, or a single-crystal alumina, and serves as one half of a casing for the cell. The ceramic substrate 12 is a planar structure forming the lid-side of the casing and comprises a lid substrate peripheral edge 14 meeting an outer major face 16 opposite an inner major face 18.

Since ceramic substrates are often formed with rough surfaces, which can lead to defective coatings such as interrupted interconnection traces, protrusions which may cause electric shorting between layers, uneven electrochemical reactions leading to poor cycling or dendrite formation, and the like, prior to incorporation into the cell, the ceramic lid substrate 12 is preferably lapped and polished with slurry or ceramic coated grinding paper followed by diamond polishing. This provides a surface roughness that is greater than zero, but less than 50 nm, and more preferably less than 10 nm.

In the illustrated embodiment, the peripheral edge 14 of the lid substrate 12 comprises opposed lid first and second edge portions 14A and 14B extending to and meeting with lid third and fourth edge portions 14C and 14D. The edge portions are of substantially equal lengths to thereby provide the lid substrate with a square shape in plan-view. In alternate embodiments, the lid substrate 12 has a non-square shape. In any event, the surface area of the outer major face 16 of the lid substrate 12 ranges from about 1 mm$^2$ to about 10 cm$^2$.

The lid substrate 12 is provided with a metallization strip 20 that is a continuous or endless strip of titanium, niobium or other metallic material having a ring-shape with an outer edge that is coincident the outer surface of the first, second, third and fourth depending edge portions 14A, 14B, 14C and 14D. The lid metallization strip 20 has a width that ranges from about 1 μm to about 250 μm and a thickness that ranges from about 0.1 μm to 25 μm to define a surrounded open area immediately adjacent to the inner major face 18 of the lid substrate.

A cathode current collector 22 is deposited as a thin-film layer that contacts the inner major face 18 of the lid substrate 12, spaced inwardly from the lid metallization strip 20. The cathode current collector is preferably a continuous layer of titanium, devoid of perforations, and has a thickness measured outwardly from the base substrate inner major face 18 that ranges from about 0.1 μm to about 3 μm. Stainless steel, tantalum, platinum, gold, aluminum, cobalt, molybdenum, nickel, copper, nickel, and alloys thereof are also suitable materials for the cathode current collector. A gap of at least about 1 μm to about 250 μm separates the cathode current collector 22 from the lid metallization strip 20.

A layer of cathode active material 24 is supported on the cathode current collector 22. The cathode active material 24 preferably extends to and is coincident with the outer peripheral edge of the current collector 22. The cathode active material 24 has a thickness that ranges from about 1 μm to about 25 μm. Suitable cathode active materials are selected from LiCoO$_2$, LiMnO$_2$, LiMn$_2$O$_4$, LiFePO$_4$, Ag$_2$V$_4$O$_{11}$, V$_2$O$_5$.

FIG. 1 further shows that the lid substrate 12 is provided with spaced-apart first and second openings 26 and 28. While not shown in the drawings, the ceramic lid substrate 12 is provided with respective perimeter metallizations surrounding the openings 26 and 28. Openings 26, 28 extend completely through the thickness of the lid substrate, and the opening metallizations are of titanium, niobium or other metallic material.

The first opening 26 is aligned over the cathode current collector 22 and the cathode active material 24 and receives a first gold-braze button 30. In a separate brazing step prior to the cathode active material 24 being contacted to the cathode current collector 22, the first gold-braze button 30 forms a hermetic seal with the ceramic lid substrate 12 and has an inner surface that contacts the cathode current collector. An outer surface of the first gold-braze button 30 is substantially co-planar with the lid substrate outer major face 16 or it extends outwardly about 50 μm above the major face. That way, the first gold-braze button 30 serves as the positive terminal for the electrochemical cell 10.

A layer of solid electrolyte 32 (Li$_x$PO$_y$N$_z$) contacts the cathode active material layer 24, opposite the cathode current collector 22 and the gold-braze button 30. The solid electrolyte layer 32 preferably extends to and curves over or around the outer peripheral edge of the cathode active material 24, but it is spaced inwardly from the lid metallization strip 20. The solid electrolyte layer 32 has a thickness that ranges from about 1 μm to about 5 μm with the curved peripheral edge contacting the inner major face 18 of the lid substrate 12.

Separately, a second plate-shaped ceramic base substrate 34 is selected from polycrystalline alumina, 3 mol % YSZ, and a single-crystal alumina and serves as the other half of the casing for the electrochemical cell 10. The ceramic base substrate 34 has a peripheral edge 36 meeting an outer major face 38 opposite an inner major face 40.

The peripheral edge 36 of the base substrate 34 comprises a rim that extends upwardly from the inner major face 40 to thereby provide a recess that is bounded by the opposed first and second upstanding edge portions 36A and 36B extending to and meeting with the third and fourth upstanding edge portions 36C and 36D. The edge portions 36A, 36B, 36C and 36D form a continuous upstanding edge surface 36E aligned along an imaginary plane that is parallel to the outer and inner major faces 38, 40 of the base substrate 34. The edge portions are of substantially equal lengths themselves and are also equal in length to those of the corresponding lid substrate first, second, third and fourth edge portions 14A, 14B, 14C and 14D. This provides the base substrate 34 with a square shape in plan-view that matches the square shape of the lid substrate 12. In any event, the surface area of the outer major face 38 of the base substrate 34 ranges from about 1 mm$^2$ to about 10 cm$^2$.

In alternate embodiments, the base substrate 34 has a non-square shape that matches that of the lid substrate 12. In that respect, those skilled in the art will readily appreciate that the lid and base substrates 12 and 34 of the electrochemical cells according to the present invention can have a myriad of different matching shapes, limited only by the device which the cell is designed to power.

The upstanding edge surface 36E of the ceramic base substrate is provided with a surrounding metallization 42. The base substrate metallization 42 is a continuous or endless strip of titanium, niobium or other metallic material having a ring-shape with an outer edge that is coincident the outer surface of the first, second, third and fourth edge portions 36A, 36B, 36C and 36D of the base substrate 34. The upstanding edge of the ceramic base substrate has a width that ranges from about 1 μm to about 250 μm to define a surrounded open recess immediately adjacent to the inner major face 40. The base metallization strip 42 has a width that ranges from about 1 μm to 250 μm and a thickness 21 that ranges from about 0.1 μm to about 25 μm.

FIG. 2 illustrates that the cathode current collector 22, cathode active material 24 and the solid electrolyte layer 32 are provided with respective corner cut-outs 22A, 24A and 32A. These cut-outs reside adjacent to the junction where the second and fourth edge portions 14B, 14D of the lid substrate 12 meet and where the second and fourth edge portions 36B, 36D of the base substrate 34 meet.

The respective corner cut-outs 22A, 24A and 32A of the cathode current collector 22, cathode active material 24 and the solid electrolyte layer 32 provide a space for an anode current collector 44 as a thin-film layer that contacts the inner major face 18 of the lid substrate 12, spaced from the cathode current collector 22. The anode current collector 44 is a continuous layer, preferably of titanium or copper, that is devoid of perforations, and has a thickness that is comparable to that of the cathode current collector 22. Stainless steel, tantalum, platinum, gold, cobalt, molybdenum, nickel, and alloys thereof are also suitable materials for the anode current collector 44. A gap that ranges from about 1 μm to about 250 μm separates the anode current collector 44 from the cathode current collector 22.

A layer of anode active material 46 contacts the solid electrolyte 32 opposite the cathode active material 24. The anode active material 46 has an extending portion 46A that laps over the solid electrolyte 32 to contact the anode current collector 44. The solid electrolyte 32 in turn has an upstanding peripheral edge 32B that physically segregates the anode active material 46 from the cathode active material 24 contacting the cathode current collector 22. The anode active material 46 has a thickness that ranges from about 1 μm to about 25 μm, and the combined thickness of the anode current collector 44 and the anode active material 46 is somewhat less than the thickness of the anode substrate upstanding peripheral edge 36. Suitable anode active materials include lithium and its alloys and intermetallic compounds including, for example, Li—Si, Li—Sn, Li—Al, Li—B and Li—Si—B alloys, and mixtures and oxides thereof.

In a similar manner as with the gold-braze terminal button 30 that resides in the first opening 26 in the lid substrate 12 and contacts the cathode current collector 22 to thereby serve as the positive terminal for the electrochemical cell 10, a second gold-braze button 48 resides in the second opening 28 in the lid substrate 12. In the brazing step where the first gold-braze button 30 forms a hermetic seal with the ceramic lid substrate 12, the second gold-braze button 48 also forms a hermetic seal with the lid substrate and has an inner surface that contacts the anode current collector 44. An outer surface of the second gold-braze 48 is substantially co-planar with the outer major face 16 of the ceramic lid substrate or it extends outwardly about 50 μm above the major face. That way, the second gold-braze button 48 serves as the negative terminal for the electrochemical cell 10.

During final cell assembly, with the lid substrate 12 supporting the cathode current collector 22, the cathode active material 24, the solid electrolyte 32, the anode current collector 44 and the anode active material 46, the lid and base substrates are moved into registry with each other. An endless gold pre-form 50 having a ring-shape is supported on either the lid metallization strip 20 or the base metallization strip 42. In either configuration, the cathode substrate 12 and the anode substrate 34 are moved together until the lid metallization strip 20 contacts one side of the gold pre-form 50 and the base substrate metallization strip 42 contacts the other side thereof.

The lid substrate 12 is preferably of a single-crystal alumina (sapphire), which is substantially transparent. The transparent sapphire lid substrate 12 allows that substrate and the base substrate 34 serving as the two case halves to be joined together by laser welding through the transparent ceramic 12 to melt the gold interlayer pre-form 50 into intimate hermetic contact with the opposed lid and base metallizations strips 20 and 42 to thereby hermetically seal the casing. This facilitates fabrication of electrochemical cells in multi-cell arrays/sheets to make the manufacturing process more cost-effective and practical.

Figure 2A:
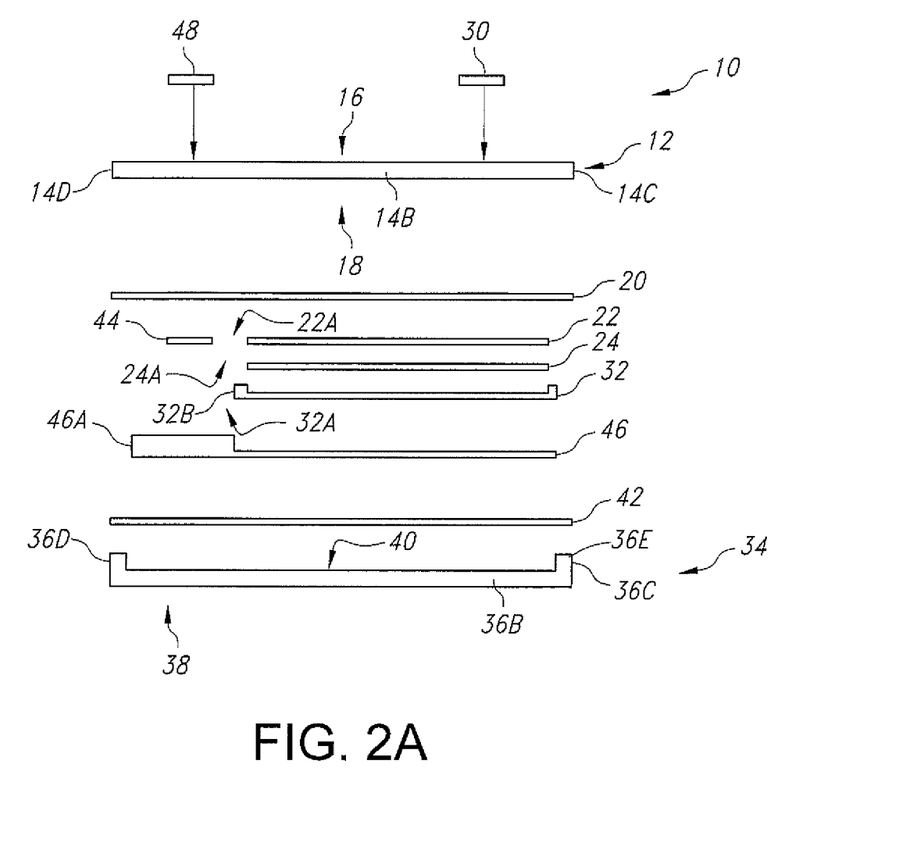
FIG. 2A is an exploded side-elevational view of the electrochemical cell 10 shown in FIG. 2, but without the gold metallization ring 50.

FIG. 2A illustrates an alternate embodiment of the electrochemical cell 10 where the gold pre-form 50 has been eliminated. Instead, the lid and base metallization strips 20 and 42 are laser welded together without the gold pre-form 50. In still a further embodiment, gold is sputtered directly onto at least one or both metallization strips 20, 42, and a laser is preferably used to hermetically weld the lid substrate 12 to the base substrate 34 to thereby hermetically seal the casing.

In an alternate embodiment, the anode and cathode active materials can be switched with each other. In this embodiment, terminal button 30 conductively contacts the anode current collector and terminal button 48 conductively contacts the cathode current collector.

Figure 3:
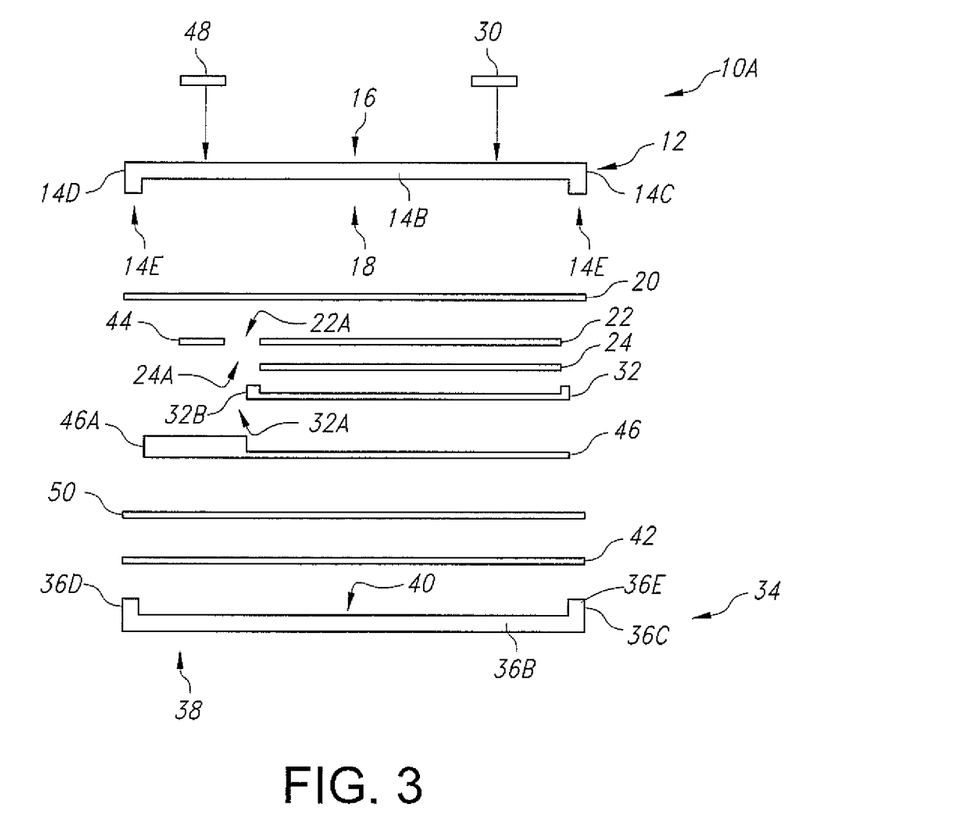
FIG. 3 is an exploded side-elevational view of another embodiment of an electrochemical cell 10A according to the present invention.

FIG. 3 illustrate another embodiment of the electrochemical cell 10A according to the present invention. Electrochemical cell 10A is similar to the electrochemical cell 10 shown in FIGS. 1, 2 and 2A with the exception that instead of being a planar structure, the lid substrate 12 has a depending rim-shaped peripheral edge 14E. The base substrate 34 has the upstanding rim-shaped peripheral edge 36E previously described with respect to FIGS. 2 and 2A. This means that the combined height of edges 14E and 36E of cell 10A in FIG. 3 is substantially equal to the height of the depending edge 14E in FIGS. 2 and 2A. In all other aspects, the cells 10, 10A are substantially similar.

Figure 3A:
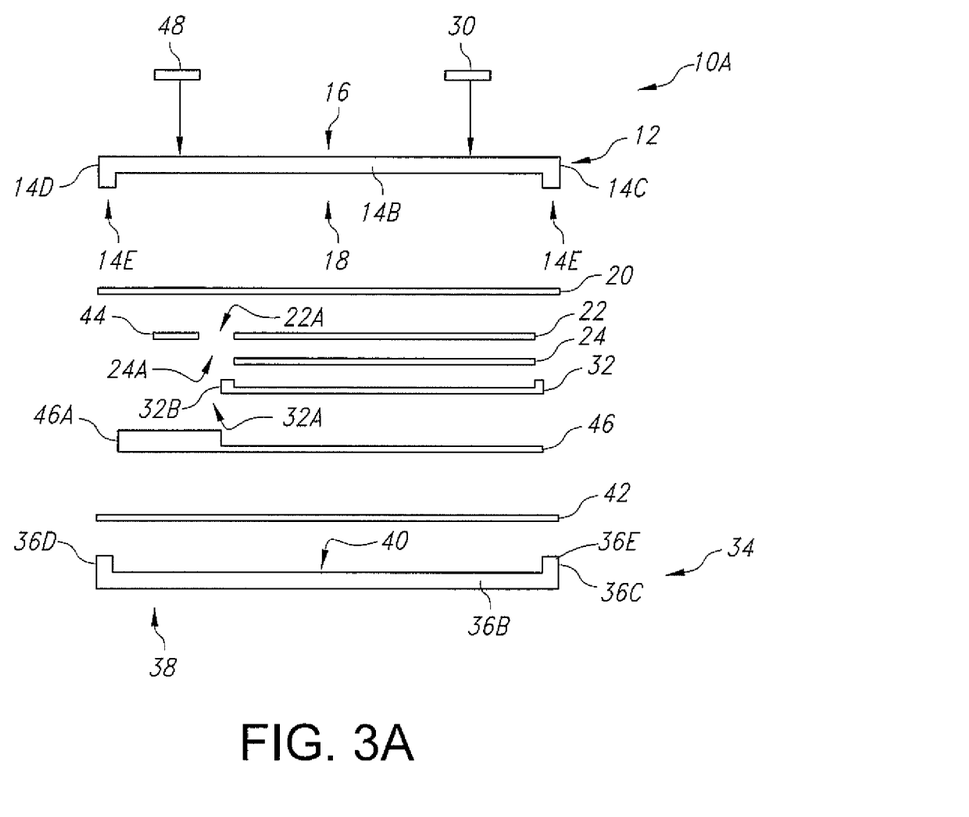
FIG. 3A is an exploded side-elevational view of the electrochemical cell 10A shown in FIG. 3, but without the gold metallization ring 50.

In a similar manner as with the cell 10 illustrated in FIG. 2A where the lid and base metallization strips 20 and 42 are laser welded together without the gold pre-form 50, FIG. 3A illustrates a similar embodiment, but with the lid substrate 12 having a depending rim-shaped peripheral edge 14E. As before, gold is sputtered directly onto at least one or both the lid and base metallization strips 20, 42, and a laser is preferably used to hermetically weld the lid substrate 12 to the base substrate 34 to thereby hermetically seal the casing.

Thus, with the outer major faces 16 and 38 of the respective lid and base substrates 12, 34 each having a surface area ranging from about 1 mm$^2$ to about 10 cm$^2$, and with the height of the cell as measured from the outer major face 16 of the lid substrate 12 to the outer major face 38 of the base substrate 34 ranging from about 250 μm to about 2.5 mm, the cells 10 and 10A of the present invention represent an advancement in electrochemical technology in that they can be built with a total volume that is less than 0.5 cc but, as hermetically sealed enclosures, are capable being implanted for extended periods of time.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:
   a) a ceramic casing, comprising:
      i) a first ceramic substrate having a first peripheral edge extending to and meeting with opposed first substrate outer and inner major faces;
      ii) a first ring-shaped metallization contacting the first substrate inner major face adjacent to the first substrate peripheral edge;

iii) a second ceramic substrate having a second substrate peripheral edge extending to and meeting with opposed second substrate outer and inner major faces; and
iv) a second ring-shaped metallization contacting the second substrate inner major face adjacent to the second substrate peripheral edge;
b) a first electrode current collector contacting the first substrate inner major face, spaced inwardly from the first ring-shaped metallization;
c) a first electrode active material contacting the first electrode current collector;
d) a second electrode current collector contacting the first substrate inner major face, spaced inwardly from the first ring-shaped metallization, wherein the first electrode current collector is side-by-side but spaced from the second electrode current collector;
e) a solid electrolyte contacting the first electrode active material;
f) a second electrode active material contacting the second electrode current collector and contacting the solid electrolyte opposite the first electrode active material;
g) a first opening extending through the first ceramic substrate, wherein a first metallization comprising titanium or niobium contacts the first ceramic substrate in the first opening and a first gold body hermetically sealed to the first metallization in the first opening conductively contacts the first electrode current collector to thereby serve as a first terminal; and
h) a second opening extending through the first ceramic substrate, wherein a second metallization comprising titanium or niobium contacts the second ceramic substrate in the second opening and a second gold body hermetically sealed to the second metallization in the second opening conductively contacts the second electrode current collector to thereby serve as a second, opposite polarity terminal for the electrochemical cell,
i) wherein the first and second ceramic substrates are hermetically sealed together at the first and second ring-shaped metallizations to thereby hermetically seal the first and second ceramic substrates together to form the casing housing the electrode assembly.

2. The electrochemical cell of claim 1, wherein the first electrode is a cathode and the second electrode is an anode, or the first electrode is an anode and the second electrode is a cathode.

3. The electrochemical cell of claim 1, wherein the outer and inner major faces of the first ceramic substrate are both substantially planar.

4. The electrochemical cell of claim 1, wherein the first and second ring-shaped metallizations are of titanium or niobium.

5. The electrochemical cell of claim 1, wherein at least one of the first and second ceramic substrates has an extending peripheral rim forming the respective first and second substrate peripheral edge, the peripheral rim supporting the respective first and second ring-shaped metallization.

6. The electrochemical cell of claim 1, wherein the solid electrolyte contacting the first electrode active material opposite the first electrode current collector does not contact the second electrode current collector.

7. The electrochemical cell of claim 1, wherein at least one of the first and second ceramic substrates has an extending peripheral rim forming the respective first and second substrate peripheral edge, the peripheral rim supporting the respective first and second ring-shaped metallization, and wherein, with the first and second ring-shaped metallizations being hermetically sealed to each other to thereby hermetically seal the first and second ceramic substrates together, a sum of a first thickness of the first electrode current collector, a second thickness of the first electrode active material, a third thickness of the solid electrolyte, and a fourth thickness of the second electrode active material is less than the distance from the first ceramic substrate inner major face to the second ceramic substrate inner major face.

8. The electrochemical cell of claim 1, wherein at least one of the first and second ceramic substrates has an extending peripheral rim forming the respective first and second substrate peripheral edge, the peripheral rim supporting the respective first and second ring-shaped metallization, and wherein, with the first and second ring-shaped metallizations comprising titanium and being hermetically sealed to each other to thereby hermetically seal the first and second ceramic substrates together, a sum of a first thickness of the first electrode current collector, a second thickness of the first electrode active material, a third thickness of the solid electrolyte, and a fourth thickness of the second electrode active material is less than the distance from the first ceramic substrate inner major face to the second ceramic substrate inner major face.

9. The electrochemical cell of claim 7, wherein the sum of the first, second, third, and fourth thicknesses is less than the distance from the first ceramic substrate inner major face to the second ceramic substrate inner major face by about 1 μm to about 100 μm.

10. The electrochemical cell of claim 1, wherein the first and second current collectors are individually selected from the group of titanium, copper, stainless steel, tantalum, platinum, gold, aluminum, cobalt, molybdenum, nickel, and alloys thereof.

11. The electrochemical cell of claim 1, wherein at least one of the first and second inner major faces of the respective first and second ceramic substrates has a surface roughness that is greater than zero, but less than 50 nm.

12. The electrochemical cell of claim 1, wherein the solid electrolyte extends between the first and second electrode current collectors.

13. The electrochemical cell of claim 1, wherein the first and second ceramic substrates are selected from the group of 3 mol % YSZ, polycrystalline alumina, and sapphire.

14. The electrochemical cell of claim 1, wherein at least one of the first and second ceramic substrates is of a substantially transparent sapphire.

15. The electrochemical cell of claim 1, wherein the anode active material is selected from the group of lithium, Li—Si, Li—Sn, Li—Al, Li—B and Li—Si—B alloys, and wherein the cathode active material is selected from the group of $LiCoO_2$, $LiMnO_2$, $LiMn_2O_4$, $LiFePO_4$, $Ag_2V_4O_{11}$, $V_2O_5$, and mixtures thereof.

16. The electrochemical cell of claim 1, wherein the solid electrolyte comprises $Li_xPO_yN_z$.

17. The electrochemical cell of claim 1 having a total volume that is less than 0.5 cc.

18. The electrochemical cell of claim 1, wherein gold does not reside between the first and second ring-shaped metallizations hermetically sealed to each other.

19. An electrochemical cell, comprising:
a) a ceramic casing, comprising:
i) a first sapphire substrate having a first peripheral edge extending to and meeting with opposed first substrate outer and inner major faces;

ii) a first ring-shaped metallization contacting the first sapphire substrate inner major face adjacent to the first substrate peripheral edge;

iii) a second ceramic substrate having a second substrate peripheral rim extending to and meeting with opposed second substrate outer and inner major faces; and iv) a second ring-shaped metallization contacting the second substrate peripheral rim;

b) a first electrode current collector contacting the first sapphire substrate inner major face, spaced inwardly from the first ring-shaped metallization;

c) a first electrode active material contacting the first electrode current collector;

d) a second electrode current collector contacting the first sapphire substrate inner major face, spaced inwardly from the first ring-shaped metallization, wherein the first electrode current collector is side-by-side but spaced from the second electrode current collector;

e) a solid electrolyte contacting the first electrode active material;

f) a second electrode active material contacting the second electrode current collector and contacting the solid electrolyte opposite the first electrode active material;

g) a first opening extending through the first sapphire substrate, wherein a first metallization comprising titanium or niobium contacts the first sapphire substrate in the first opening and a first gold body hermetically sealed to the first metallization in the first opening conductively contacts the first electrode current collector to thereby serve as a first terminal; and h) a second opening extending through the first sapphire substrate, wherein a second metallization comprising titanium or niobium contacts the first sapphire substrate in the second opening and a second gold body hermetically sealed to the second metallization in the second opening conductively contacts the second electrode current collector to thereby serve as a second, opposite polarity terminal for the electrochemical cell, i) wherein the first and second ring-shaped metallizations are hermetically sealed to each other to thereby hermetically seal the first and second ceramic substrates together to form the casing housing the electrode assembly.

20. The electrochemical cell of claim 19, wherein the first electrode is a cathode and the second electrode is an anode, or the first electrode is an anode and the second electrode is a cathode.

21. The electrochemical cell of claim 19, wherein the first sapphire substrate has a first substrate peripheral rim forming the substrate peripheral edge and the first ring-shaped metallization contacts the first substrate peripheral rim.

22. The electrochemical cell of claim 19, wherein gold does not reside between the first and second ring-shaped metallizations hermetically sealed to each other.

23. A method for providing an electrochemical cell, the method comprising the steps of:

a) providing a ceramic casing, comprising:
i) providing a first ceramic substrate having a first peripheral edge extending to and meeting with opposed first substrate outer and inner major faces;

ii) providing first and second openings extending through the first ceramic substrate;

iii) contacting a first metallization comprising titanium or niobium to the first ceramic substrate in the first opening and contacting a second metallization comprising titanium or niobium to the first ceramic substrate in the first opening;

iv) contacting a first ring-shaped metallization to the first substrate inner major face adjacent to the first substrate peripheral edge;

v) providing a second ceramic substrate having a second substrate peripheral edge extending to and meeting with opposed second substrate outer and inner major faces, wherein at least one of the first and second ceramic substrates is a substantially transparent ceramic;

vi) contacting a second ring-shaped metallization to the second substrate inner major face adjacent to the second substrate peripheral edge; and vii) brazing first and second gold terminals to the respective first and second metallizations in the respective first and second openings extending through the first ceramic substrate; and b) providing an electrode assembly, comprising:
i) depositing a first current collector on the first substrate inner surface, wherein the first current collector conductively contacts the first gold terminal;

ii) depositing a second current collector on the first substrate inner surface, wherein the second current collector is spaced from the first current collector and conductively contacts the second gold terminal;

iii) contacting a first active material to the first current collector;

iv) contacting a solid electrolyte to the first active material opposite the first current collector;

v) contacting a second active material to the solid electrolyte opposite the first active material, wherein the second active material conductively contacts the second current collector;

c) moving the first ceramic substrate into registry with the second ceramic substrate so that the first and second ring-shaped metallizations contact each other; and d) laser welding through the at least one of the first and second ceramic substrates being the substantially transparent ceramic to thereby braze the first and second ring-shaped metallizations to each other to thereby join the first and second ceramic substrate together to form the ceramic casing housing the electrode assembly.

24. The method of claim 23, including providing the at least one of the first and second ceramic substrates as a substantially transparent sapphire substrate.

25. The method of claim 23, including providing the first electrode as a cathode and the second electrode as an anode, or the first electrode as an anode and the second electrode as a cathode.

26. The method of claim 23, including brazing the first and second ring-shaped metallizations to each other without using gold.

* * * * *